United States Patent Office 3,347,898
Patented Oct. 17, 1967

3,347,898
2,3-BIS(DIFLUORAMINO)-1,4-DICYANOBUTANE
Marvin L. Peterson, Woodbury, N.J., assignor to E. I. du Pont de Nemours and Company, Wilmington, Del., a corporation of Delaware
No Drawing. Filed July 16, 1962, Ser. No. 211,471
3 Claims. (Cl. 260—465.5)

This invention relates to a new fluoramino-substituted cyanoalkane compound and its preparation.

The compound of the invention is 2,3-bis(difluoramino)-1,4-dicyanobutane. It can be represented by the formula:

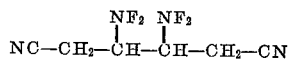

2,3-bis(difluoramino)-1,4-dicyanobutane is prepared, in accordance with this invention, by the reaction of tetrafluorohydrazine with 1,4-dicyano-2-butene in an inert solvent at a temperature within the range from about 50° C. to about 200° C. and superatmospheric pressure.

The solvent used in carrying out the process of the invention can be any liquid which dissolves the dicyano olefin and is not reactive with the reaction components under the conditions employed. The solvent can also be a solvent for the tetrafluorohydrazine reactant, but that is not essential. Preferably, the solvent is low-boiling so that it can be removed easily from the reaction product. Compounds particularly useful as solvents are the halogenated hydrocarbons, e.g., chloroform, carbon tetrachloride, methylene chloride, and chlorofluoro hydrocarbons such as 1,1,2 - trichloro-1,2,2-trifluoroethane. Hydrocarbons, e.g., benzene; ketones, e.g., acetone; and ethers, e.g., dioxane, also are useful.

The temperature at which the reaction is effected will vary according to other reaction variables but in general is within the range from about 50° C. to about 200° C. Temperatures from about 75° C. to about 175° C. are preferred.

The use of superatmospheric pressure, for example at least about 70 p.s.i. ga., is desirable to achieve a reasonably high reaction rate and to prevent any low-boiling solvent from vaporizing. Pressures as high as 1,000 p.s.i. ga. can be used, although generally there is no advantage in operating at pressures much above 500 p.s.i. ga. A preferred pressure range is from about 150 p.s.i. ga. to about 500 p.s.i. ga.

At least stoichiometric quantities of the reactants will be employed, i.e., one mole of tetrafluorohydrazine per mole of 1,4-dicyano-2-butene. However, it is preferred to introduce an excess of tetrafluorohydrazine into the reaction zone to assure complete reaction, the particular amount used over and above the stoichiometric amount having no critical effect on the reaction.

The following example illustrates a preferred method of preparing the compound of the invention. The example will be understood to be illustrative only and not to limit the invention in any manner.

EXAMPLE

Tetrafluorohydrazine (F$_2$N—NF$_2$) under an initial pressure of 250 p.s.i. ga. was introduced into a 250-milliliter pressure vessel containing a solution of 2.65 grams of 1,4-dicyano-2-butene in 75 milliliters of chloroform, and the mixture was heated at 125° C. for four hours, after which time there was no further pressure drop. Evaporation of the chloroform from the reaction mixture left a crystalline product which, after recrystallization from chloroform, was white and melted at 75–76° C. The product was identified by infrared spectrum as 2,3-bis(difluoramino)-1,4-dicyanobutane. The principal bands were at 4.45μ (nitrile absorption) and 10.9μ, 11.4μ, and 11.75μ (—NF$_2$ absorption).

Approximately 50% of the weight of the 2,3-bis(difluoramino)-1,4-dicyanobutane compound of the invention is difluoramino (—NF$_2$) groups, which groups constitute a source of considerable energy upon decomposition of the compound. As a result, the compound is useful as an explosive and as a rocket propellant. Certain explosive characteristics of the compound are illustrated by the tests described below.

*Brisance.*—The compound was placed in a 0.25-inch-diameter shell, the shell placed on end on a lead plate 1.5 inch x 1.5 inch x 5/32 inch thick, and the compound initiated by a blasting cap. A No. 2 hole was produced in the plate, indicating a high degree of brisance, a No. 0 hole indicating the greatest explosive power measurable by the test, and a No. 6 indicating only indentation of the plate.

*Sensitivity to heat.*—The compound decomposed violently at 160° C. when heated gradually (at ca. 5° C./minute) in a copper block. Fume-off occurred when the compound was dropped onto a metal bar heated to 250° C.

*Impact sensitivity.*—The compound detonated in 50% of the trials made when a 1-kg. weight was dropped onto it from the distance of 480 cm.

The invention has been described in detail in the foregoing. It will be apparent to those skilled in the art that many variations are possible without departure from the scope of the invention. Therefore, I intend to be limited only by the following claims.

I claim:
1. 2,3-bis(difluoramino)-1,4-dicyanobutane.
2. A process for the preparation of 2,3-bis(difluoramino)-1,4-dicyanobutane which comprises reacting tetrafluorohydrazine with 1,4-dicyano-2-butene in an inert solvent at a temperature within the range of about 50° C. to about 200° C. and superatmospheric pressure.
3. A process according to claim 2, wherein the inert solvent is a chlorinated hydrocarbon.

References Cited
UNITED STATES PATENTS
3,215,709    11/1965    Logothetis _____ 260—349

JOSEPH P. BRUST, *Primary Examiner.*
CARL D. QUARFORTH, *Examiner.*
J. W. WHISLER, *Assistant Examiner.*